(12) United States Patent
Page

(10) Patent No.: US 11,420,725 B2
(45) Date of Patent: Aug. 23, 2022

(54) ELEVON DESIGN FOR ALL-AXIS CONTROL IN A BLENDED WING BODY AIRCRAFT

(71) Applicant: Blended Wing Aircraft, Inc., Orange, CA (US)

(72) Inventor: Mark A. Page, Orange, CA (US)

(73) Assignee: Blended Wing Aircraft, Inc., Orange, CA (US)

(*) Notice: Subject to any disclaimer, the term of this patent is extended or adjusted under 35 U.S.C. 154(b) by 311 days.

(21) Appl. No.: 16/730,707

(22) Filed: Dec. 30, 2019

(65) Prior Publication Data

US 2020/0207460 A1 Jul. 2, 2020

Related U.S. Application Data

(60) Provisional application No. 62/786,610, filed on Dec. 31, 2018.

(51) Int. Cl.
*B64C 9/02* (2006.01)
*B64C 39/10* (2006.01)

(52) U.S. Cl.
CPC ............... *B64C 9/02* (2013.01); *B64C 39/10* (2013.01); *B64C 2039/105* (2013.01)

(58) Field of Classification Search
CPC .... B64C 9/12; B64C 9/16; B64C 9/18; B64C 5/10; B64C 3/50; B64C 9/02
See application file for complete search history.

(56) References Cited

U.S. PATENT DOCUMENTS

| | | | | |
|---|---|---|---|---|
| 2,156,403 | A * | 5/1939 | Riviere | B64C 9/18 244/215 |
| 5,222,699 | A | 6/1993 | Albach et al. | |
| 7,004,428 | B2 * | 2/2006 | Tracy | B64C 9/18 244/35 R |
| 10,800,511 | B2 * | 10/2020 | Dickey | F16B 1/02 |
| 2003/0197097 | A1 * | 10/2003 | Wakayama | B64C 3/10 244/215 |
| 2011/0303796 | A1 | 12/2011 | Etling | |

FOREIGN PATENT DOCUMENTS

| | | | | |
|---|---|---|---|---|
| CN | 107472511 A | | 12/2017 | |
| DE | 102006036389 A1 * | | 2/2008 | ........... B64C 27/615 |
| DE | 102006036389 A1 | | 2/2008 | |
| EP | 1631493 A2 | | 3/2006 | |
| WO | WO2018005302 A1 | | 1/2018 | |

OTHER PUBLICATIONS

International Search Report and Written Opinion dated Mar. 10, 2020 for PCT Application No. PCT/US2019/068913, 9 pages.

* cited by examiner

*Primary Examiner* — Richard R. Green
*Assistant Examiner* — William L Gmoser
(74) *Attorney, Agent, or Firm* — Caldwell Intellectual Property Law

(57) ABSTRACT

Technologies for providing blended wing body aircraft control surfaces are described herein. In some examples, one or more of the control surfaces have angular configurations that reduce the formation of air vortexes when in upward or downward configurations, thereby reducing the drag on the aircraft when the control surfaces are being used.

15 Claims, 8 Drawing Sheets

ELEVON DESIGN FOR ALL-AXIS CONTROL IN A BLENDED WING BODY AIRCRAFT

CROSS REFERENCE TO RELATED APPLICATIONS

This application claims the benefit of U.S. Provisional Application No. 62/786,610 filed Dec. 31, 2018, which is incorporated herein by reference in its entirety.

BACKGROUND

Conventional aircraft consist essentially of a wing section and a fuselage. This so-called "tube and wing" configuration enables convenient packaging of passengers and cargo, but has certain drawbacks. In most cases, passengers are seated on a deck disposed approximately on the vertical centerline of the fuselage, while cargo is stowed beneath. This enables a relatively wide, flat floor for seats and separates cargo operations from passenger loading and unloading. Passengers can be loaded via one or more passenger doors, while cargo can be loaded from one or more cargo hatches on the underside or sides of the fuselage. This configuration also provides a relative constant fuselage cross section (less the nose and tail cones), enabling a substantially percentage of the available volume of the fuselage to be utilized.

In conventional aircraft, such as a tube and wing configuration, a combination of elevators and ailerons may be used to provide various controls to the aircraft. For a tube and wing configured, elevators may provide pitch control of the aircraft, while the ailerons (usually used as pairs on opposite wings) are used to control the roll (or movement about a longitudinal axis) of the aircraft. Some aircraft employ the use of split-drag-rudder type of ailerons, whereby the upper and lower surfaces of the ailerons move in opposite directions to increase the drag of the aircraft.

In a blended wing body ("BWB") aircraft, the functions of the elevator and aileron may be combined into one control surface at the trailing edge of the BWB aircraft called an elevon. In a BWB configuration, both the fuselage and the wing provide lift. As the name implies, the blended wing blends the wing and fuselage together to provide a single, lift-producing body. In this configuration, the fuselage serves to both carry passengers and/or cargo and to provide a significant portion of the lift. As a result, the wing portion can be smaller for a given payload. Thus, blended wing aircraft tend to have significantly lower overall drag and can carry larger payloads while consuming less fuel.

An issue with conventional elevator and aileron control surfaces is the drag created when using the surfaces for pitch (elevator) or roll (ailerons). One major source of drag is a gap between the control surface and the edge of the adjacent wing when the control surface is being used. FIG. 1 illustrates the creation of vortex drag in conventional control surface use. Illustrated in FIG. 1 is a partial view of a wing 100 and control surface 102. The control surface 102 may be an elevator, aileron, or elevon depending on the particular type of aircraft to which the control surface 102 is installed and used. The control surface 102 illustrated in FIG. 1 is in a downward configuration, whereby a top layer 104 of the control surface 102 is below a bottom layer 106 of the wing 100. When in the downward configuration, a gap forms between a wing edge 106A proximate to a control surface edge 108A. A gap also forms between a wing edge 106B proximate to a control surface edge 108B. While the gaps may cause various airflows, the gaps illustrated in FIG. 1 cause vortex airflows 110A and 110B, which cause drag on the aircraft. FIG. 1B further illustrate vortex drag. In FIG. 1B, the control surface 102 is in a downward position, creating vortexes 110A-110D, which are relatively large compared to the size of the control surface 102. Thus, a relatively large amount of drag is created in these conventional control surfaces.

It is with these and other considerations that the presently disclosed subject matter is described.

SUMMARY

In a BWB aircraft, a unified control scheme is described herein. The unified control scheme uses angular control surfaces. The angular control surfaces are designed to reduce the formation of vortex airflows when the control surfaces are in the upward or downward (in-use) positions.

DETAILED DESCRIPTION

Examples of the present disclosure related generally to providing a unified control scheme that uses angular control surfaces in a BWB aircraft. In some examples of the presently disclosed subject matter, one or more control surfaces used to control the aircraft (e.g. roll, pitch, and the like). The control surfaces use obtuse angle planforms to reduce the creation of drag on the aircraft when the control surfaces are being used. Further, in some examples, groups of control surfaces can be used together to provide for pitch control, roll control, asymmetric drag control for yaw. In some examples, the angular control surfaces, when used, do not create an exposed edge gap.

Figure 2:
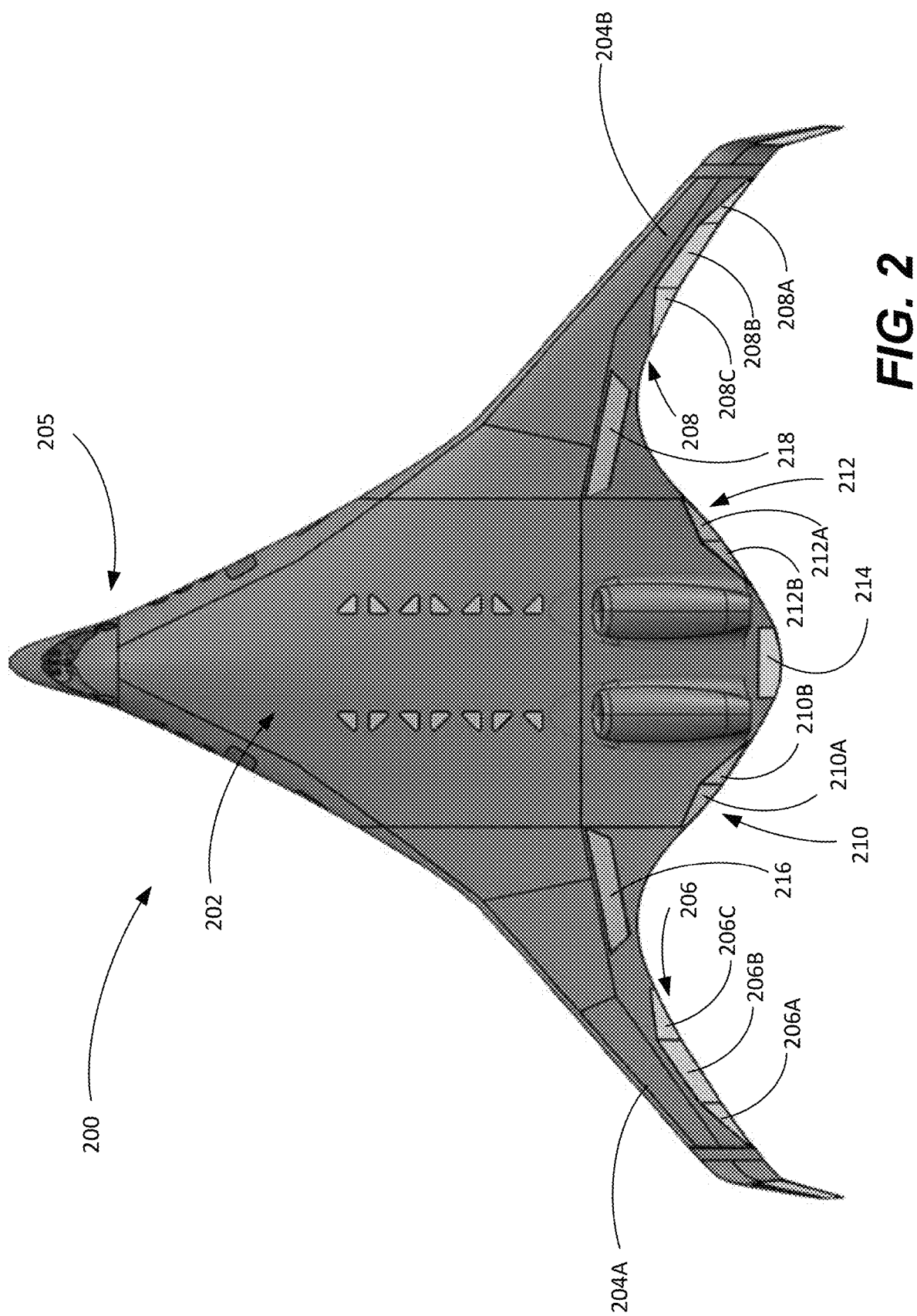
FIG. 2 is top-down view of a BWB aircraft with angular control surfaces, according to some examples disclosed herein.

FIG. 2 is a top-down view illustration of a BWB aircraft 200, according to some examples disclosed herein. As illustrated in FIG. 2, the BWB aircraft 200 includes a fuselage 202. The fuselage 202 includes a port wing 204A and a starboard wing 204B that are continuously coupled to a nose section 205 of the BWB aircraft 200. The fuselage 202 and wings 204A and 204B are each illustrated to have positive sweep angles. The BWB aircraft 200 of FIG. 2 is a single deck BWB aircraft configuration, though various examples of the presently disclosed subject matter can be used with different BWB aircraft having more than one deck.

The BWB aircraft 200 includes multiple, movable control surfaces that allow a pilot to control the BWB aircraft 200.

Figure 3:
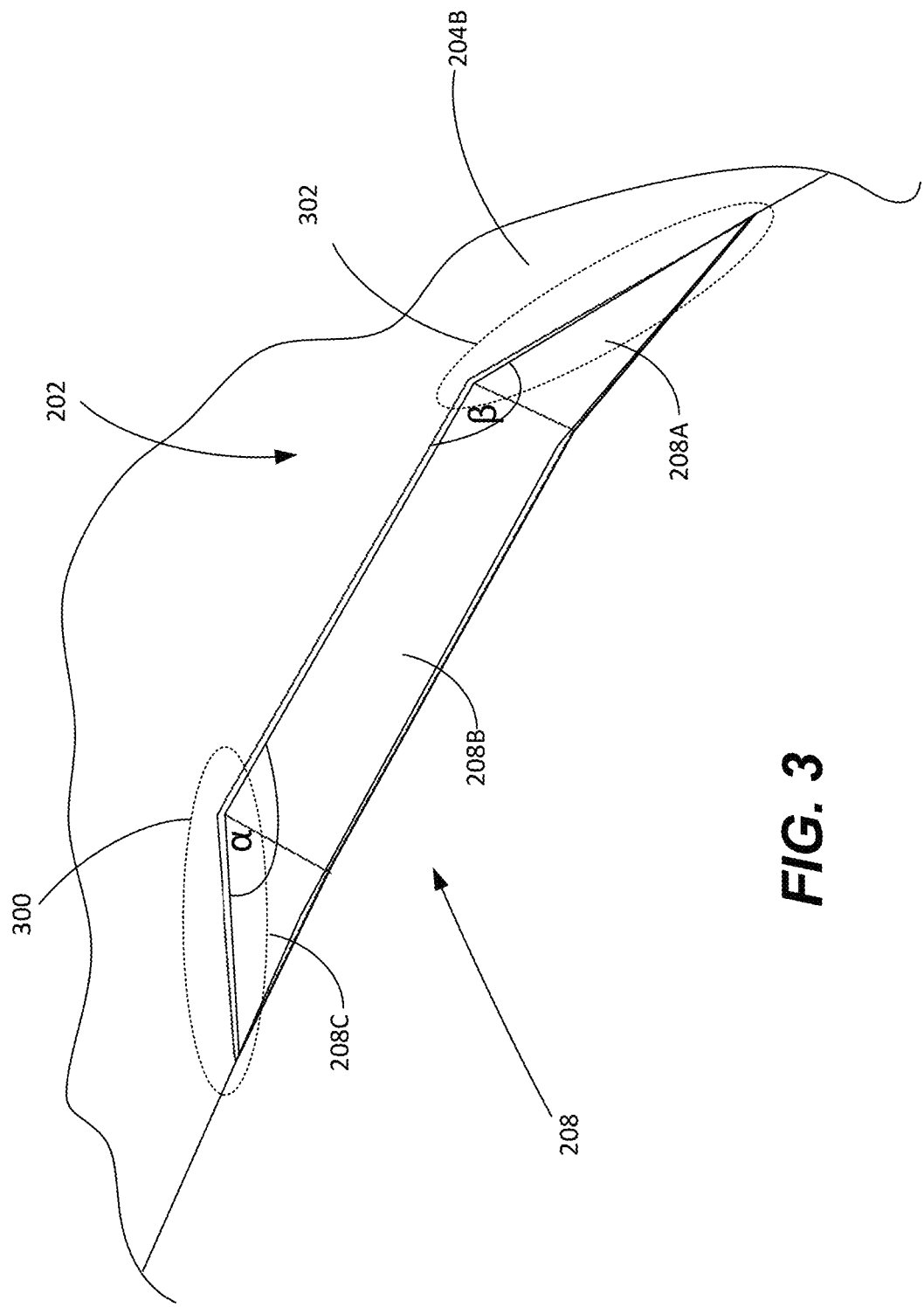
FIG. 3 is a top-down illustration of a set of angular control surfaces, according to some examples disclosed herein.

The BWB aircraft 200 of FIG. 2 includes multiple sets of control surfaces having obtuse angle planforms (illustrated in more detail in FIG. 3). As noted above with respect to conventional aircraft, control surfaces when used often create vortex drag due to the angle and space between the edge of the control surface and the aircraft's fuselage.

The BWB aircraft 200, to minimize the creation of drag such as vortex drag, includes port outer control surface triplet 206. The port outer control surface triplet 206 comprises individually controllable control surfaces 206A, 206B, and 206C. In a similar manner, the BWB aircraft 200 includes starboard outer control surface triplet 208. The starboard outer control surface triplet 208 comprises individually controllable control surfaces 208A, 208B, and 208C. The BWB aircraft 200 further includes port inner control surface doublet 210. The port inner control surface doublet 210 comprises individually controllable control surfaces 210A and 210B. The BWB aircraft 200 further includes starboard inner control surface doublet 212. The starboard inner control surface doublet 212 comprises individually controllable control surfaces 212A and 212B. The BWB aircraft 200 may further include a midship control surface 214, which may be used for, among other uses, air braking, and port control surface 216 and starboard control surface 218.

The port outer control surface triplet 206, the starboard outer control surface triplet 208, the port inner control surface doublet 210, the starboard inner control surface doublet 212, the midship control surface 214, the port control surface 216, and the starboard control surface 218 may be collectively or individually to provide control surfaces such as ailerons, elevators, elevons, flaps, brakes, and rudders. The port outer control surface triplet 206, the starboard outer control surface triplet 208, the port inner control surface doublet 210, the starboard inner control surface doublet 212, the midship control surface 214, the port control surface 216, and the starboard control surface 218 may be movable in an upward direction, a downward direction, or a split configuration. In a split configuration, a top surface of the particular control surface moves upward and a bottom surface of the same control surface moves downward. Further, as mentioned above, each of the control surfaces comprising the port outer control surface triplet 206, the starboard outer control surface triplet 208, the port inner control surface doublet 210, the starboard inner control surface doublet 212, the midship control surface 214, the port control surface 216, and the starboard control surface 218 may be moved individually or with other control surfaces.

As mentioned previously, to reduce the creation of vortex drag and other types of drag when used, one or more of the control surfaces may have obtuse angle planforms. FIG. 3 is an illustration of the starboard outer control surface triplet 208 showing an obtuse angle planform. As illustrated in FIG. 3, the starboard outer control surface triplet 208 includes the individually controllable control surfaces 208A, 208B, and 208C installed on the starboard wing 204B of the fuselage 202.

Figure 1A:
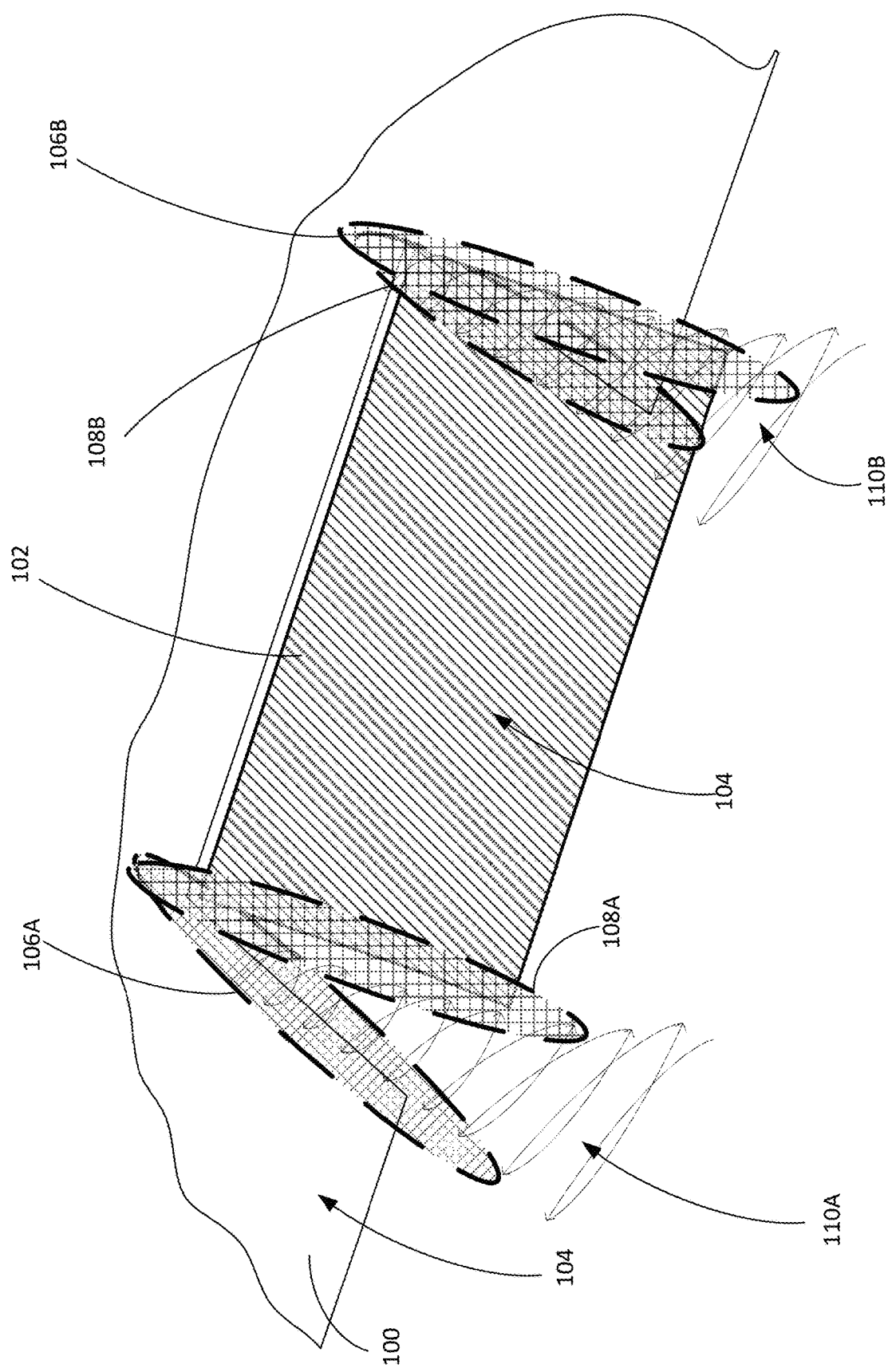
FIGS. 1A and 1B illustrate vortex drag created in conventional control surface use.
Figure 1B:
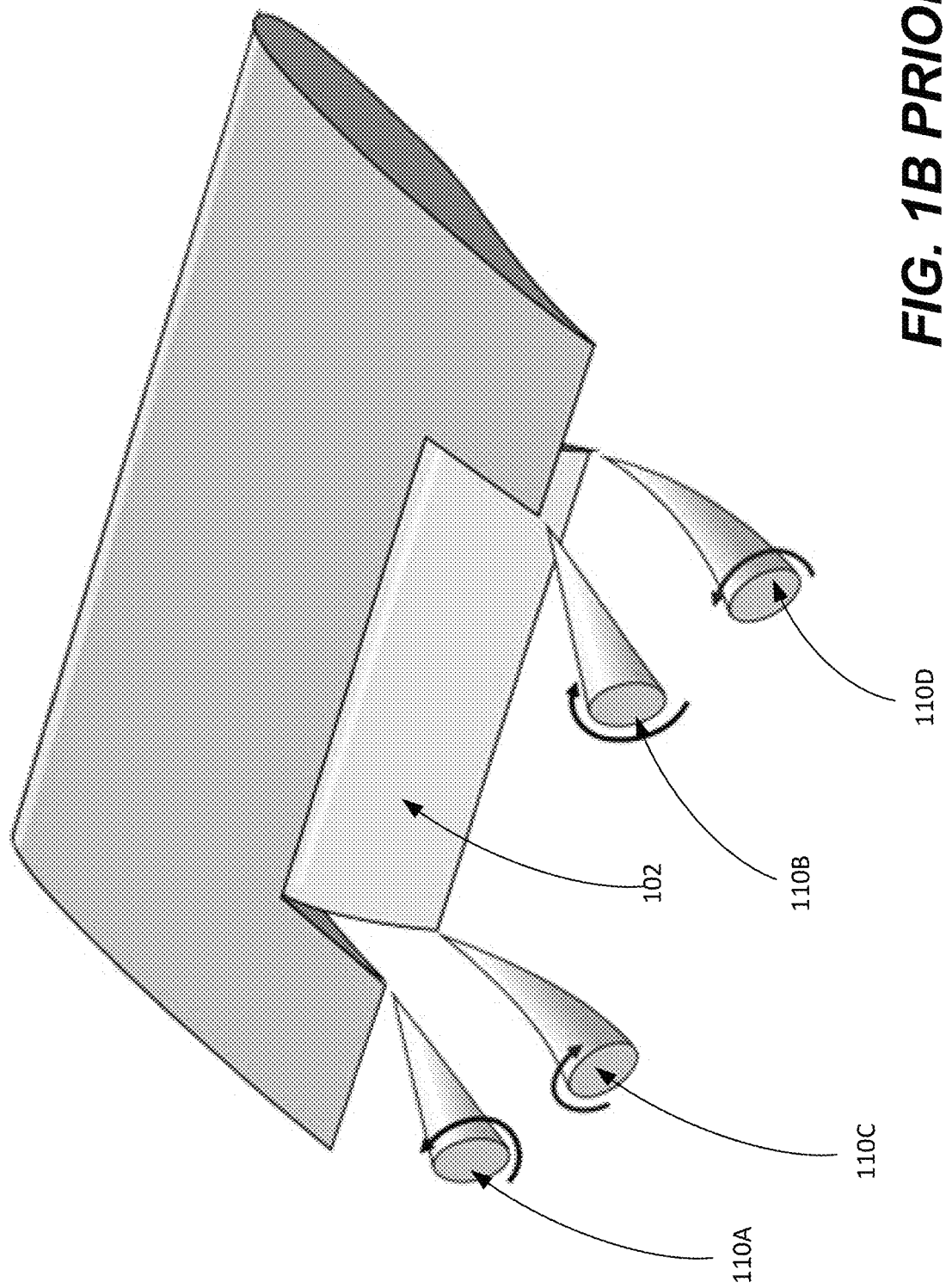

As shown in FIG. 1, when a control surface is moved from a neutral or middle position, the interface between the edge of the control surface and the wing (or another control surface) can create vortex drag. To minimize the effect, an edge interface 300 is created by the control surfaces 208C, 208B, and the wing 204B having a triangular shape and having an interface angle of $\alpha$. In a similar manner, an edge interface 302 is created by the control surfaces 208B, 208A, and the wing 204B having a triangular shape and having an interface angle of $\beta$. The interface angle $\alpha$ and the interface angle $\beta$ allow for a smoother transition of air when the control surfaces are in an upward or downward position, illustrated in more detail in FIG. 4A. In some examples, the interface angle $\alpha$ and/or the interface angle $\beta$ may range from 20 degrees to less than 90 degrees, and in some configurations, range from 30 degrees to 60 degrees. It should be understood that the interface angle $\alpha$ and/or the interface angle $\beta$ may be angles fewer than 20 degrees. It should be noted that the edge interface may also be applied to doublet or singlet configurations, such as the port inner control surface doublet 210, the starboard inner control surface doublet 212, the midship control surface 214, the port control surface 216, and the starboard control surface 218.

Figure 4A:
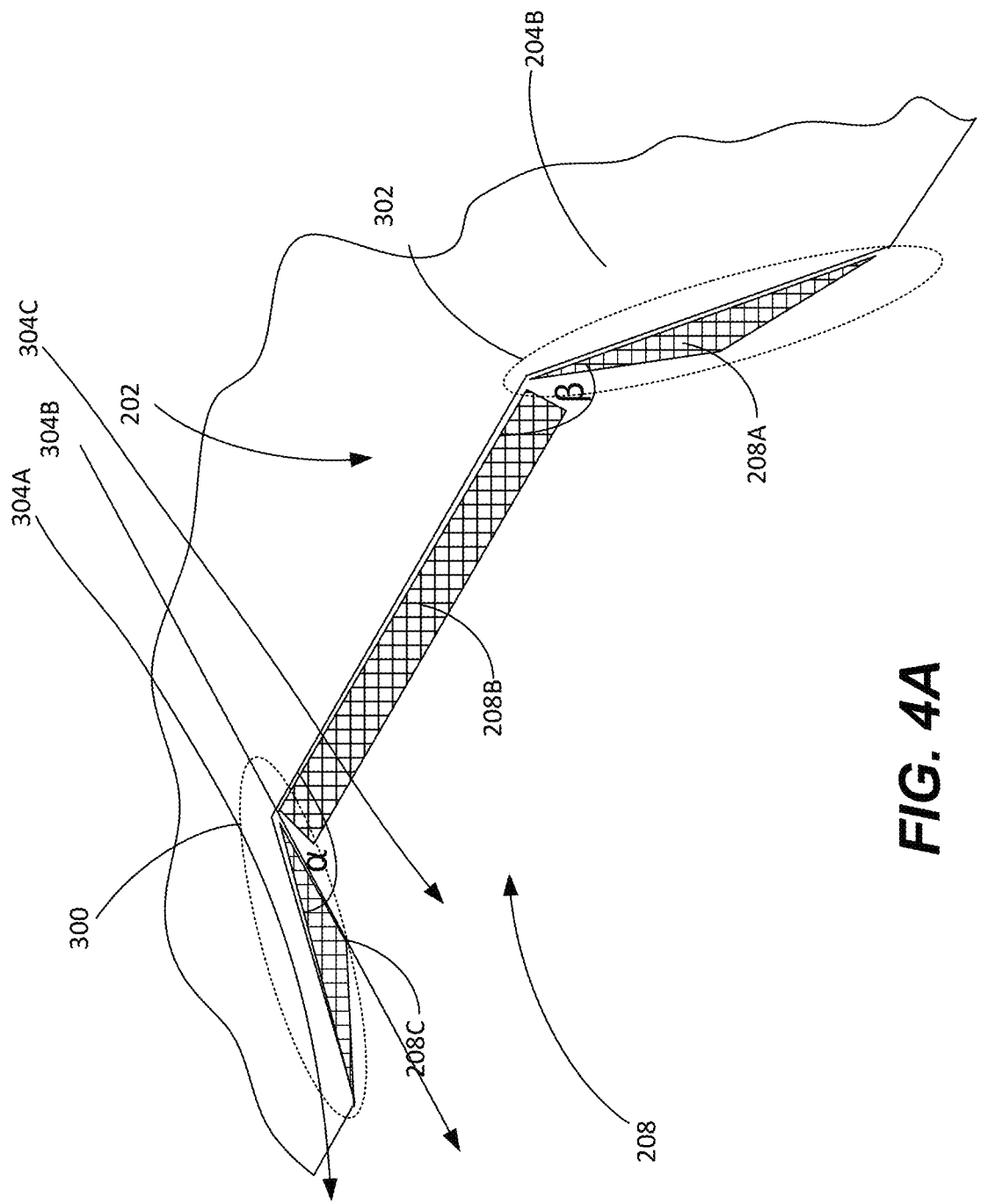
FIG. 4A is a top-down illustration of a set of angular surface in an upward configuration, according to some examples disclosed herein.

FIG. 4A is an illustration of the starboard outer control surface triplet 208 showing an obtuse angle planform with individual control surfaces in an upward configuration. As illustrated in FIG. 4A, the individually controllable control surfaces 208A, 208B, and 208C installed on the starboard wing 204B of the fuselage 202 are in an upward (or rotated above the wing) configuration. The rotation may be done using conventional control systems such as hydraulics, pneumatics, electrical, and other types of control systems used to move control surfaces on conventional aircraft.

As illustrated in FIG. 4A, the edge interface 300 created by the control surfaces 208C, 208B, and the wing 204B when the control surfaces 208C and 208B are upwards is not appreciably different than as illustrated in FIG. 3 when the control surfaces 208C and 208B are in a neutral position. Similarly, as illustrated in FIG. 4A, the edge interface 302 created by the control surfaces 208B, 208A, and the wing 204B when the control surfaces 208B and 208A are upwards is not appreciably different than as illustrated in FIG. 3 when the control surfaces 208B and 208A are in a neutral position. Because the edge interfaces 300 and 302 are similar when the control surfaces are in an upward, downward, or neutral configuration, the amount of drag created when used may be minimized. This is generally illustrated by airflows 304A, 304B, and 304C moving over the surfaces, as opposed to the airflows illustrated in FIG. 1.

Figure 4B:
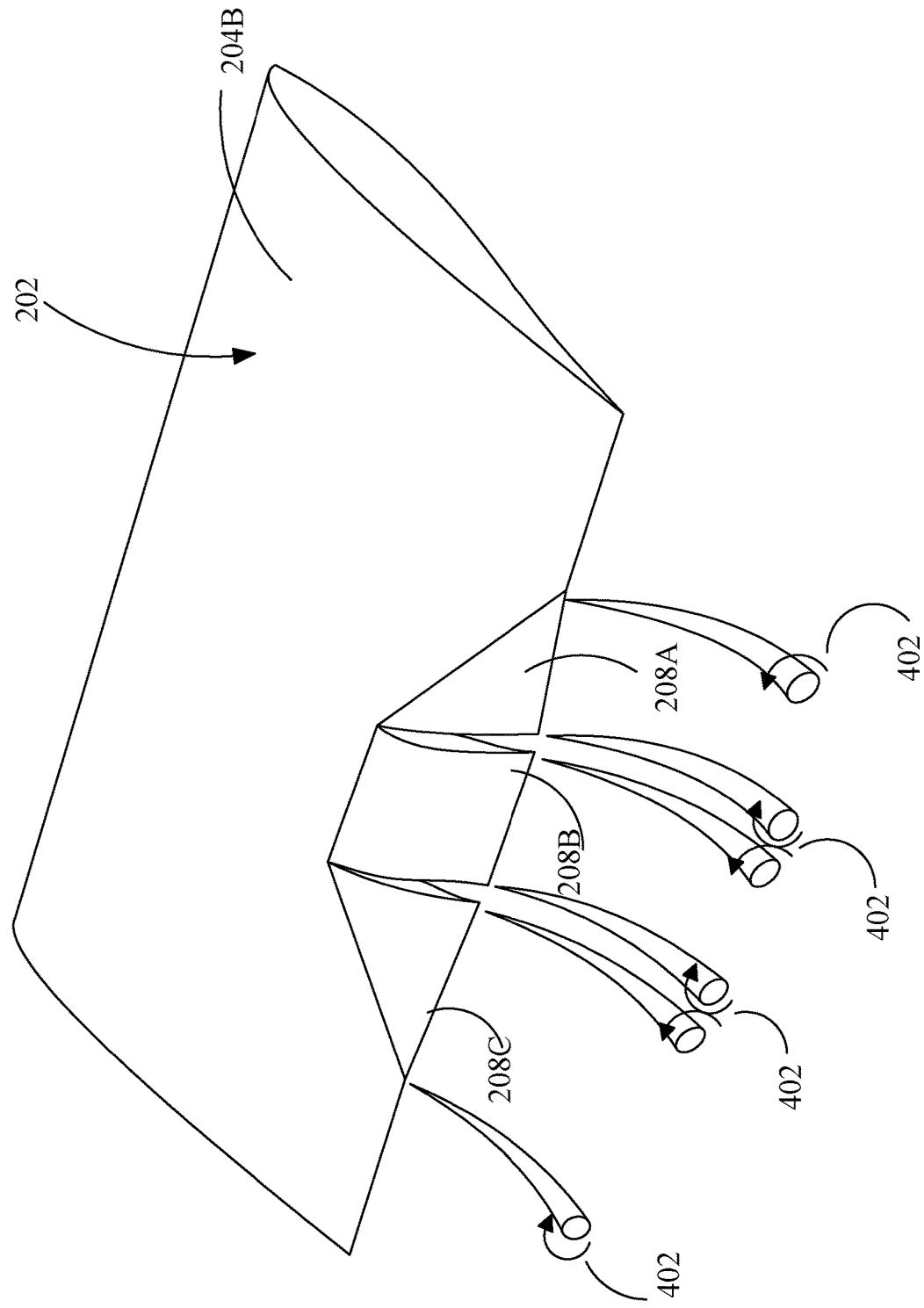
FIG. 4B are a top-down illustration of a set of angular surfaces in an downward configuration, according to some examples disclosed herein.

FIG. 4B is an illustration of the starboard outer control surface triplet 208 showing an obtuse angle planform with individual control surfaces in a downward configuration to further illustrate vortexes. In FIG. 4B, the individually controllable control surfaces 208A, 208B, and 208C installed on the starboard wing 204B of the fuselage 202 are in a downward (or rotated below the starboard wing 204B) configuration. Vortexes 402 are illustrated. As illustrated, the size of the vortexes 402 are relatively smaller than the vortexes 110A-110D illustrated in FIGS. 1A and 1B. Thus, using obtuse angle planforms, the size of the vortexes can be reduced, reducing the drag on the aircraft while providing similar or the same performance characteristics.

Figure 5A:
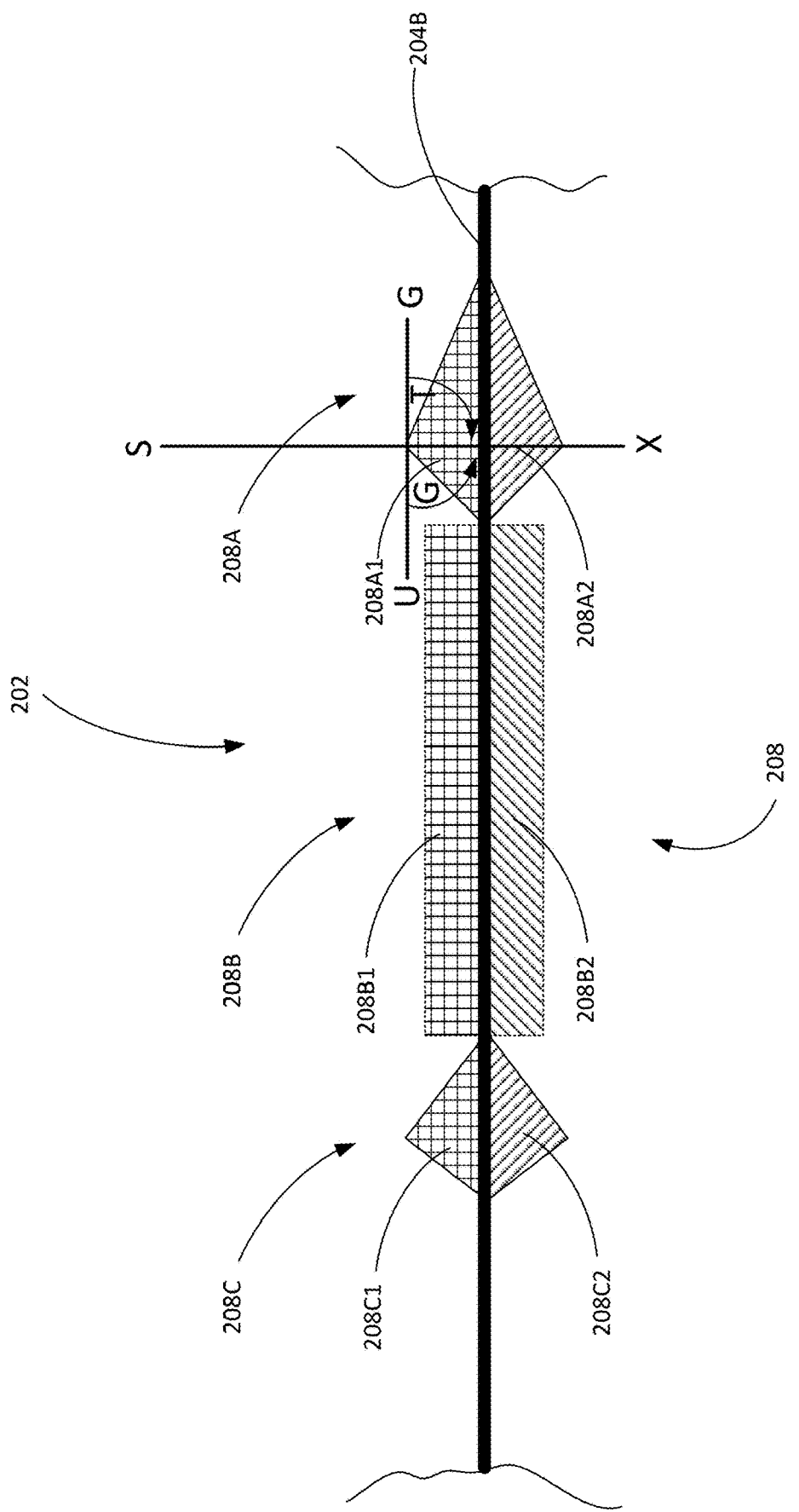
FIG. 5A is a rear-view illustration of a set of angular surfaces in a split configuration, according to some examples disclosed herein.

FIG. 5A is a rear-view illustration of a set of angular surfaces in a split configuration, according to some examples disclosed herein. Illustrated in FIG. 5A is the starboard outer control surface triplet 208 having the individually controllable control surfaces 208A, 208B, and 208C installed on the starboard wing 204B of the fuselage 202. In some examples, one or more of the control surfaces may be used to slow the airplane or to retard the flow of air at a particular location. In this example, the individually controllable control surfaces 208A, 208B, and 208C, by way of example, may have an upper and lower surface than can be raised and lowered at the same time.

As illustrated, the individually controllable control surface 208A includes upper control surface 208A1 and lower control surface 208A2. As illustrated, the individually controllable control surface 208B includes upper control surface 208B1 and lower control surface 208B2. As illustrated, the individually controllable control surface 208C includes upper control surface 208C1 and lower control surface 208C2. The upper and lower control surfaces may be controlled individually or may be moved upwards or downwards as a unit.

The various control surfaces may have various degrees. For example, the upper control surface 208A1 may be constructed such that inner interface angle G, the surface proximate to the upper control surface 208B1 as measured from the intersection of lines UG and SX, is in the range of 1 degree to 89 degrees, and in some examples, in the range of 20 degrees to 70 degrees, and in still further examples, in the range of 40 degrees to 60 degrees. For the purposes of providing an example only, the upper control surface 208A1 inner interface angle G is illustrated as 45 degrees. In a similar manner, the upper control surface 208A1 may be constructed such that outer interface angle T, the surface distal to the upper control surface 208B1 as measured from the intersection of lines UG and SX, is in the range of 1 degree to 89 degrees, and in some examples, in the range of 20 degrees to 70 degrees, and in still further examples, in the range of 40 degrees to 60 degrees. For the purposes of providing an example only, the upper control surface 208A1 outer interface angle T is illustrated as 30 degrees. Other control surfaces may be similarly constructed with various angles.

Figure 5B:
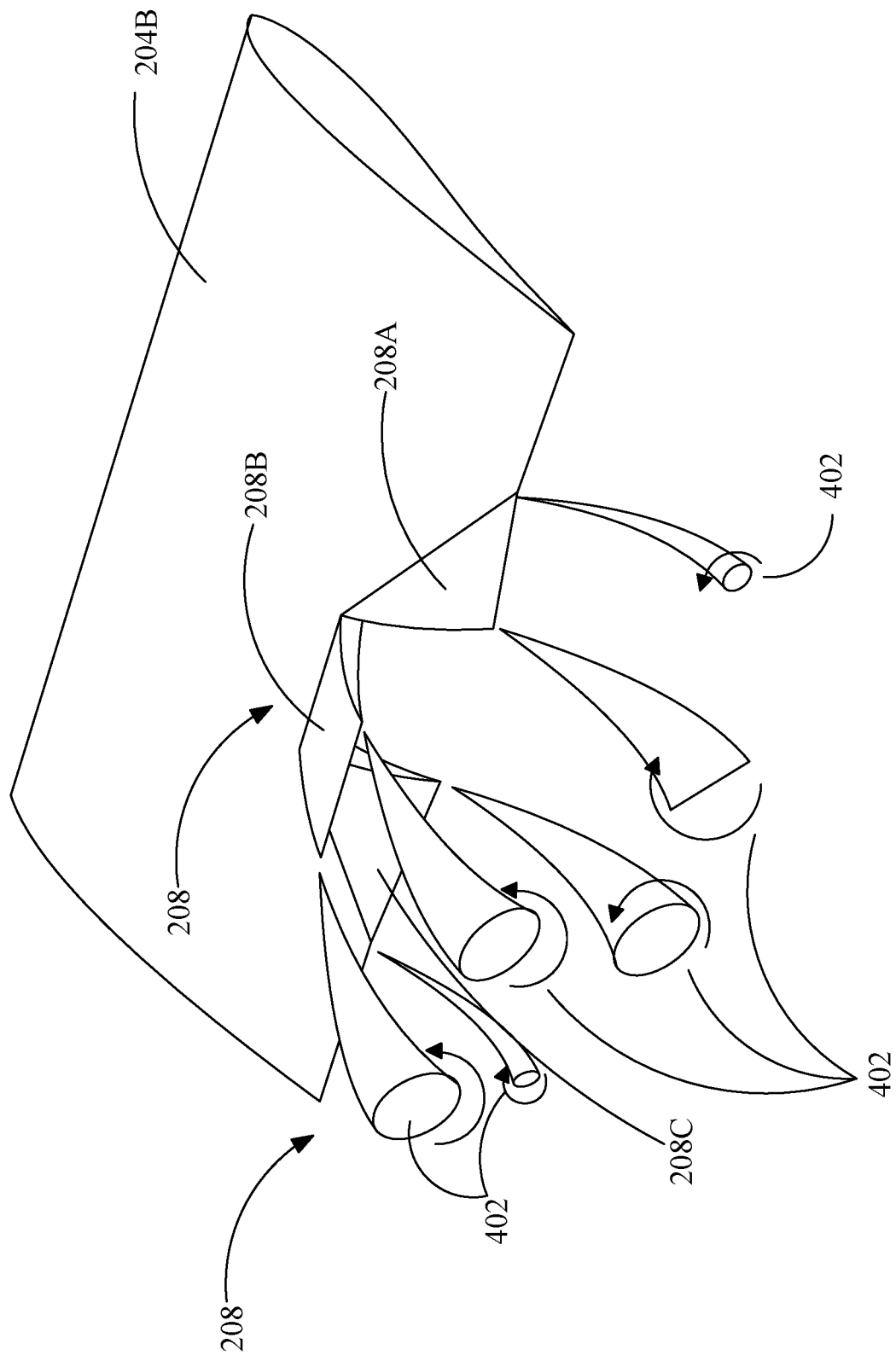
FIG. 5B is a rear-view illustration of a set of angular surfaces in an alternative split configuration, according to some examples disclosed herein.

FIG. 5B is a rear-view illustration of a set of angular surfaces in an alternative split configuration, according to some examples disclosed herein. Illustrated in FIG. 5B is the starboard outer control surface triplet 208 having the individually controllable control surfaces 208A, 208B, and 208C installed on the starboard wing 204B of the fuselage 202. In some examples, one or more of the control surfaces may be used to slow the airplane or to retard the flow of air at a particular location. In this example, the individually controllable control surfaces 208A, 208B, and 208C, by way of example, may be individually movable to create a desired airflow pattern. In this alternative split configuration illustrated in FIG. 5B, the individually controllable control surface 208B is in an upward configuration and the individually controllable control surfaces 208A and 208C are in a downward configuration. This configuration creates vortexes 502.

While several possible embodiments are disclosed above, embodiments of the present invention are not so limited. For instance, while several possible configurations of hydraulic cylinders, linear actuators, valves, and motors, other suitable actuators and controls could be selected without departing from the spirit of embodiments of the invention. In addition, the location and configuration used for various features of embodiments of the present disclosure can be varied according to a particular aircraft, airport, or landing gear design that requires a slight variation due to, for example, size or weight constraints, runway length, aircraft type, or other factors. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

The invention claimed is:

1. An airplane, comprising:
    a fuselage;
    a port wing and a starboard wing continuously coupled to the fuselage and a nose section; and
    a first control surface triplet on the port wing, the first control surface triplet comprising three discrete control surfaces, a first control surface, a second control surface and a third control surface, wherein the first control surface has a first triangular planform comprising:
        a first edge coincident a trailing edge of the port wing;
        a second edge rotatably affixed to the port wing; and
        a third edge proximal the second control surface, wherein both a first inner control surface angle, between the second edge and the third edge, and a first outer control surface angle, between the first edge and the second edge, are within a first range from 1 degree to 89 degrees.

2. The airplane of claim 1, wherein the third control surface has a second triangular planform comprising:
    a fourth edge coincident the trailing edge of the port wing;
    a fifth edge rotatably affixed to the port wing; and
    a sixth edge proximal the second control surface, wherein both a second inner control surface angle, between the fifth edge and the sixth edge, and a second outer control surface angle, between the fourth edge and the fifth edge are the first range from 1 degree to 89 degrees.

3. The airplane of claim 2, further comprising:
    a second control surface triplet on the starboard wing, the second control surface triplet comprising a fourth control surface, a fifth control surface and a sixth control surface, wherein the fourth control surface comprises a third inner control surface angle in the first range from 1 degree to 89 degrees, in the second range of 20 degrees to 70 degrees, or in the third range of 40 degrees to 60 degrees, and wherein the fourth control surface comprises a third outer control surface angle in the first range from 1 degree to 89 degrees, in the second range of 20 degrees to 70 degrees, or in the third range of 40 degrees to 60 degrees.

4. The airplane of claim 1, wherein a sixth control surface comprises a fourth inner control surface angle in the first range from 1 degree to 89 degrees, in the second range of 20 degrees to 70 degrees, or in the third range of 40 degrees to 60 degrees, and wherein the sixth control surface comprises a fourth outer control surface angle in the first range from 1 degree to 89 degrees, in the second range of 20 degrees to 70 degrees, or in the third range of 40 degrees to 60 degrees.

5. The airplane of claim 1, wherein the first control surface, the second control surface, or the third control surface are movable in an upward direction or a downward direction.

6. The airplane of claim 1, wherein the first control surface, the second control surface, or the third control surface are movable in a split configuration wherein a top surface of the first control surface, the second control surface, or the third control surface is movable in an upward direction and a bottom surface of the first control surface, the second control surface, or the third control surface is movable in a downward direction.

7. The airplane of claim 1, wherein the first control surface, the second control surface, or the third control surface are individually controllable.

8. The airplane of claim 1, wherein the first control surface and the second control surface have a first edge interface angle of 30 degrees to 60 degrees.

9. The airplane of claim 1, wherein the second control surface and the third control surface have a second edge interface angle of 30 degrees to 60 degrees.

10. The airplane of claim 1, further comprising a starboard inner control surface doublet on the starboard wing and a port inner control surface doublet on the port wing.

11. The airplane of claim 1, further comprising:
a midship elevon;
a port control surface; and
a starboard control surface.

12. The airplane of claim 11, wherein the midship elevon, the port control surface, and the starboard control surface are comprised of obtuse angle planforms.

13. The airplane of claim 1, wherein the first control surface triplet comprises an elevon.

14. The airplane of claim 1, wherein the first inner control surface angle and the first outer control surface angle are within a second range from 20 degrees to 70 degrees.

15. The airplane of claim 1, wherein the first inner control surface angle and the second outer control surface angle are within a third range from 40 degrees to 60 degrees.

* * * * *